Feb. 12, 1924.
O. WEBER
TIRE GAUGE
Filed May 22, 1922
1,483,701
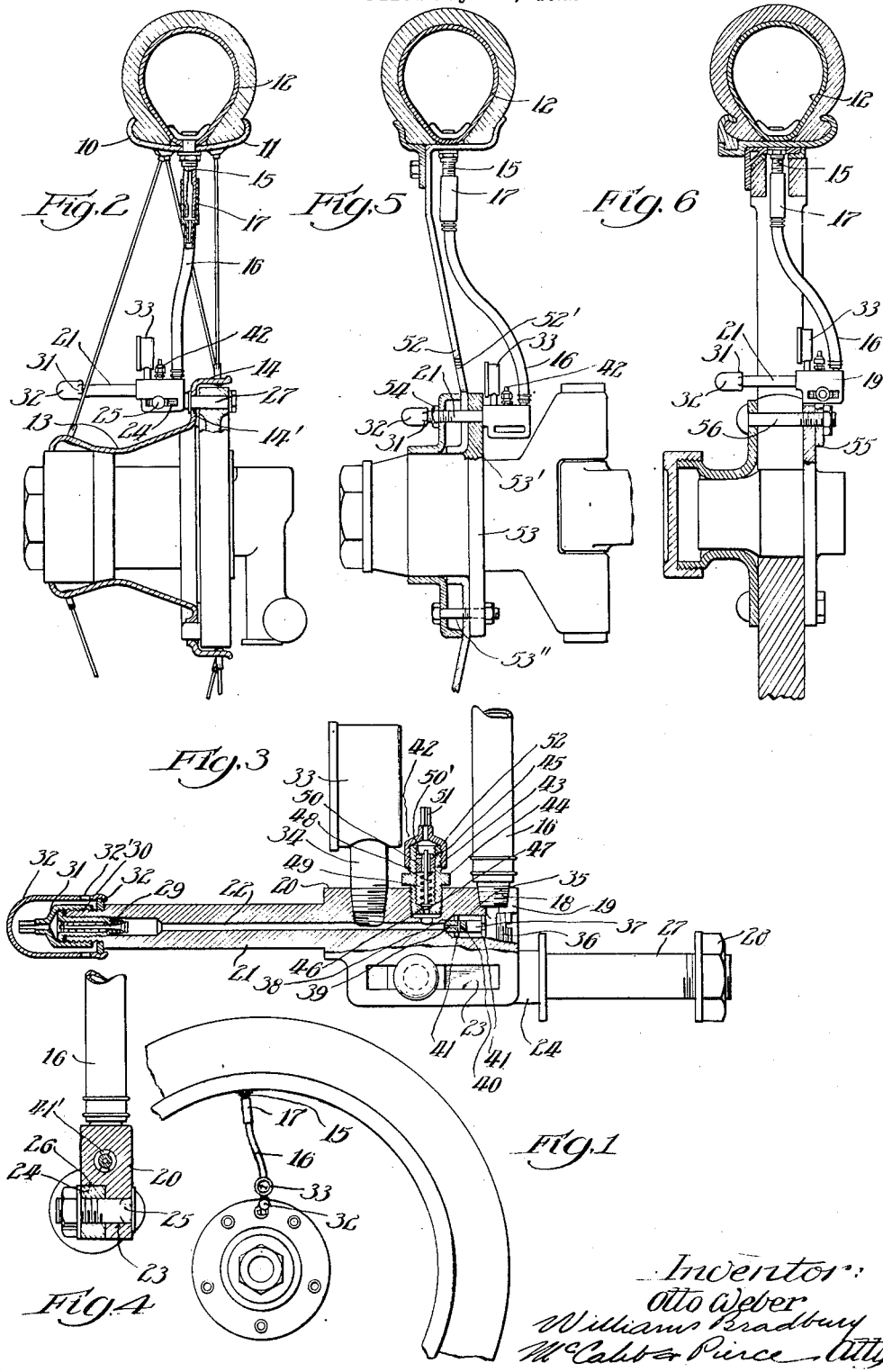
Inventor:
Otto Weber
Williams Bradbury
McCaleb & Pierce Attys Patented Feb. 12, 1924.

1,483,701

UNITED STATES PATENT OFFICE.

OTTO WEBER, OF MANTENO, ILLINOIS.

TIRE GAUGE.

Application filed May 22, 1922. Serial No. 562,590.

*To all whom it may concern:*

Be it known that I, OTTO WEBER, a citizen of the United States, and resident of Manteno, in the county of Kankakee and State of Illinois, have invented a certain new and useful Improvement in Tire Gauges, of which the following is a full, clear, concise, and exact description, reference being made to the accompanying drawings, forming a part of this specification.

My invention relates to a tire gauge, and more particularly to a constantly reading tire gauge, which is supported adjacent the hub of a vehicle wheel, the objects of my invention being:

First: The provision of a tire gauge supported adjacent the hub of the wheel, and having associated therewith a stem projecting substantially at right angles to the plane of the wheel, the stem being adapted to receive the coupling of an air hose.

Second: The provision of a tire gauge and associated mounting of such novel design that the device may be mounted upon different types of vehicle wheels, without the necessity of more than minor alterations in the wheel in the application of the device.

Third: The provision of a novel mounting for a tire gauge adjacent the hub of a vehicle wheel, providing for adjustment of its associated air hose receiving stem, relative to the plane of the wheel.

Fourth: The provision of a constantly reading tire gauge mounted on a vehicle wheel, the gauge being protected from sudden increases of pressure due to impact upon the pneumatic tire of the wheel by means of a partially closing check valve interposed between the tire and the gauge; and Fifth: The provision of an air hose receiving stem mounted adjacent the hub of a vehicle wheel, and communicating with the tire of the wheel, with a safety valve interposed between the stem and the tire, the safety valve being of a simple and compact construction, and of such design that it is adapted to receive a standard valve cap, and can be adjusted to release at a desired pressure by the use of the bifurcated shank of a standard valve cap.

Other objects of my invention will later herein appear.

As the principles of my invention are best understood when explained in connection with a specific application of them, I shall proceed immediately with the description of the accompanying drawings, wherein—

Figure 1 is an elevation of a portion of a wire-spoked vehicle wheel embodying my invention;

Figure 2 is a longitudinal vertical section of the wheel shown in Figure 1;

Figure 3 is a detail view, partly in elevation, and partly in longitudinal section of the device of my invention;

Figure 4 is a transverse section taken on the line 4—4 of Figure 3; and

Figures 5 and 6 are, similarly to Figure 2, longitudinal vertical sections of vehicle wheels, but illustrating the application of the device to disk and artillery wheels, respectively.

Similar characters of reference refer to similar parts throughout the several views.

Referring to Figures 1 and 2, 10 indicates generally a wire-spoked automobile wheel comprising a rim 11, a pneumatic tire 12 on the rim, and a hub 13, having an outwardly extending flange 14 at its inner end. The tire 12 is provided with the customary valve stem 15, which passes through the rim 11, but from which the valve closure has been removed. A flexible conduit or hose 16 is secured to the valve stem 15 by means of a coupling member 17, which threads onto the stem at its lower end. The conduit 16, by means of a coupling stud 18, is secured to a valve housing 19.

The valve housing 19 comprises a block portion 20, an outwardly and horizontally projecting shank 21, a passageway 22 extending longitudinally through the shank 21 and the block 20, and a slotted rectangular hole 23 at the lower side of the block portion 20.

As shown in Figure 4, that part of the block portion of the housing which embraces slot 23 is of reduced thickness, allowing for the positioning immediate the slot 23 of a supporting bracket 24, which is clamped to the housing 19 by means of a carriage bolt 25. The contacting of the upper surface of the supporting bracket 24 with the under surface of the cutaway portion 26 of the housing 19 prevents rotation of the housing relative to the supporting bracket about the bolt 25 as a pivot. The inner end 27 of the bracket 24 is cylindrical in form, and passes through a hole 14' in the flange 14 of the wheel hub, and is secured by a nut 28.

The shank 21 of the valve housing 19 terminates beyond the outer row of spokes in the wheel, and is provided with a check valve 29, such as is used in the standard tire valve, the valve being inserted in the enlarged outer end of the passage 22. The shank 21 is reduced in diameter at its outer end 30, and is threaded for the reception of a standard tire valve cap 31. A washer 32 is threaded onto the inner end of the reduced shoulder 30, and over the periphery of this washer are snapped the spring fingers 32' of a dust cap 32. The reduced end 30 of the shank of the housing, it is to be understood, is adapted to receive the coupling of an air hose or pump hose for the inflating of the tire.

A suitable pressure gauge 33 is mounted upon the valve housing 19, the stem 34 of the gauge being threaded into the block portion 20, and communicating with the passage 22. The inner end of the passage 22 comprises an enlarged bore 35, which is closed by a plug 36, and in which is reciprocably mounted a valve 37. The valve 37 comprises a longitudinally disposed stem, the nose of which contacts a valve seat 38 at the inner end of the enlarged bore 35. The nose of the stem 37 is provided with a very small longitudinally drilled duct 39, and with a cross-duct 40, the two ducts being so disposed that they form a communication between the flexible conduit 16 and the passage 22, and hence between the tire 12 and the gauge 33. The valve stem 37 is provided with a plurality of annular flanges 41, which serve to support the valve in proper alignment. Portions of the flanges 41 are cut away as at 41', in order to afford a free passageway for air passing from the tire pump through the passage 22 and into the tire from the conduit 16.

It is obvious that except when the tire is being inflated, the air pressure in the tire communicated through the conduit 16 will hold the nose of the valve stem 37 in engagement with the seat 38, thereby closing all communication between the tire and the gauge 33 except through the small ducts 39 and 40. Any sudden increase in pressure in the tire, such as would be caused by an impact in the path of the vehicle, can be communicated to the valve only through the ducts 39 and 41. As these ducts are of very small cross-sectional area, it will take an appreciable time for the pressure in the passage 22 and in the stem 34 of the gauge to build up a pressure equal to that in the tire. This insures a relatively slow movement of the delicate indicating mechanism of the gauge, and obviates all danger to the gauge resulting from sudden and extreme increases of pressure. The restricting valve also permits the sudden increase of pressure in the tire due to engaging a projection from the road bed from being communicated to the safety valve with consequent loss of a small amount of air each time the tire engages an uneven road bed surface.

A safety valve 42 is also supported in the valve housing 19, and communicates with the passage 22 between the air hose receiving stem 30 and the partially closing check valve 37. The safety valve 42 comprises a hollow bushing 43 threaded into the housing 19 by means of a hexagonally formed flange 44. The bushing 43 is provided with a threaded bore 45, at the inner end of which is formed a valve seat 46, which is engaged by a rubber washer 47 on the valve head of the valve stem 48. A helical spring 49 surrounds the valve stem 48, and is disposed between the head of the valve and a hollow plug 50, which is threaded into the bore 45, and through which passes the valve stem 48. The outer end of the plug 50 is provided with notches 50' for the reception of the bifurcated stem 51 of a standard tire valve cap 52, which is threaded on the outer end of the bushing 43.

In the inflating operation, the coupling of an air hose is fitted over the valve stem 30, and the tire inflated, the valves 29 and 37 yielding to allow the free passage of air. When the pressure in the tire, and hence the pressure in the passage 22, has reached a predetermined point, the safety valve 42 yields against the pressure of the spring 49, and allows the excess pressure to be discharged without damage to the tire. For adjusting the tension of the spring 49, to regulate the pressure at which the safety valve 42 will function, the cap 52 is removed and inverted, the bifurcations 51 of the cap engaging the notches 50' of the plug 50, and the plug threaded outwardly until the spring 49 yields at the desired pressure, as indicated by the gauge 33.

In Figure 5, I have illustrated the device of my invention as applied to a disk type of wheel, the bracket 24 being dispensed with and the shank 21 passed through suitable holes in the disk 52 and the flange 53' of the hub 53. When thus applied, the shank 21 is threaded at its outer end, and the nut 54 is threaded thereon to clamp the block portion 20 of the housing against the inner wall of the flange 53', whereby the housing is held rigidly upon the hub, and the air hose receiving nipple 30 protrudes through the hub at a very convenient location. The shank 21 may be placed through holes drilled through the hub for that express purpose, or the shank may be substituted for one of the retaining bolts 53''. When the housing is thus mounted, the disk 52 is provided with a circular aperture 52' through which the gauge may be viewed from the outside of the wheel.

In Figure 6, I have shown the device applied to a wheel of the artillery type, the housing 19 being supported by a radially extending bracket 55, which is clamped by one of the bolts 56, passing through the flanges of the hub. When thus supported, the shank 21 of the housing projects outwardly from between adjacent ends of the wooden spokes. The tire gauge 33 is thus supported at the inner side of the wheel, and is protected by the adjacent spokes from accidental injury.

It is to be observed that in all of the applications of the device herein shown the nipple connection 18 of the conduit 16 of the housing 19 is laterally offset from the stem 15 to provide a bend in the conduit, whereby the latter may be drawn upwardly to the tire stem 15 by the coupling member 17 without danger of pulling the conduit hose from its connections. The nipple 18 and the valve stem 15 are also preferably radially offset, as indicated in Figure 1, for the same purpose. It is obvious that with a bend of this character in the conduit, the tendency is for the ends to push themselves apart, and thus better secure their airtight connection with the respective nipples.

It will be apparent from the description of the application of the device of my invention to three specific forms and types of vehicle wheels that the novel design of my invention affords almost universal adaptation to vehicle wheels without material alterations in the wheels themselves. Because of the novel type of supporting bracket used where brackets are more advantageous, a longitudinal adjustment is allowed, whereby the air hose receiving stem may be adjusted longitudinally of the wheel hub so that the stem projects a distance convenient for the application of the air hose, but not so far as to endanger the stem by accidental injury.

Having thus described my invention, what I claim is new and desire to secure by Letters Patent of the United States is:

1. In a tire inflating attachment, a tube, a check valve in said tube, a safety valve communicating with said tube to prevent harmful pressures being produced therein, means for joining said tube to the valve stem of a tire on a wheel, and a valve between said safety valve and the valve stem arranged to permit the free passage of air to the stem but restrict the passage of air in the opposite direction.

2. In a tire inflating attachment, a tube, a check valve in said tube, means for securing said tube to the hub of a vehicle wheel, a pressure gauge communicating with said tube, means for joining said tube to the valve stem of a tire on the wheel, a valve between said gauge and the valve stem arranged to permit the free passage of air to the stem but restrict the passage of air in the opposite direction, and a safety valve communicating with said tube to prevent harmful pressures being produced therein.

3. In a tire inflating attachment, a tube, a check valve in said tube, a pressure gauge communicating with said tube, a safety valve communicating with said tube, a tire valve connection for the tube and a valve between said pressure gauge and safety valve on one side and said tire valve connection on the other side and arranged to permit the free passage of air to the stem but restrict the passage of air in the opposite direction.

4. The combination of a wheel having an inflatable tire provided with an inflation valve, of a tube member secured to the wheel substantially in parallelism with the axis thereof and adjacent the hub, the outer end of said tube member extending beyond the spokes of the wheel and having a pump connection and a check valve, a conduit connecting the inner end of the tube member with the inflation valve of the tire, a pressure gauge carried by an intermediate portion of the tube member, a safety valve carried by the tube member and located between the gauge and the conduit which connects the tube with the inflation valve of the tire.

5. A tire inflation device comprising a tube member provided at one end with a check valve and a pump connection and at its opposite end with a tire valve connection, means for securing the tube member to a wheel in substantial parallelism with the axis thereof and adjacent the hub of the wheel, and a safety valve carried by an intermediate portion of the tube member.

6. A tire inflation device comprising a tube member provided at one end with a check valve and a pump connection and at its opposite end with a tire valve connection, means for securing the tube member to a wheel in substantial parallelism with the axis thereof and adjacent the hub of the wheel, and a gauge and a safety valve carried by an intermediate portion of the tube member.

In witness whereof, I hereunto subscribe my name this 16th day of May, 1922.

OTTO WEBER.

Witnesses:
LILLIAN CONTOIS,
WM. STOCKSDALE.